3,470,133
Patented Sept. 30, 1969

1

3,470,133
WATER WASHING POLYESTERS OF CARBONIC ACID AND DIPHENOLS
Howard R. Ohme, Akron, Ohio, assignor to PPG Industries, Inc., a corporation of Pennsylvania
No Drawing. Continuation-in-part of application Ser. No. 386,763, July 31, 1964. This application Sept. 15, 1967, Ser. No. 668,195
Int. Cl. C08g *17/003, 17/13*
U.S. Cl. 260—47
4 Claims

ABSTRACT OF THE DISCLOSURE

Organic solutions of carbonic acid polyesters of diphenols are washed with aqueous solutions of carbon dioxide to remove organic nitrogen catalyst.

RELATED APPLICATIONS

This application is a continuation-in-part of application Ser. No. 386,763, filed July 31, 1964 now abandoned.

BACKGROUND OF THE INVENTION

The present invention involves the manufacture of polyester resins, notably carbonic acid polyesters of diphenols such as alkylidene diphenols exemplified by p,p'-isopropylidene bisphenol (Bisphenol A).

One method of producing high molecular weight polycarbonates of 2,2 - (4,4' - dihydroxy-diphenyl)-propane (synonymous with p,p'-isopropylidene bisphenol and Bisphenol A) involves phosgenation of an alkylidene bisphenol in the presence of a hydrogen halide acceptor. Usually, such a method entails adding phosgene normally over an extended period of time, i.e., 30 to 200 minutes, to a reaction medium formed from an aqueous alkali metal hydroxide solution, a bisphenol, and a substantially water insoluble organic solvent for the polycarbonate product, e.g., a normally liquid partially chlorinated hydrocarbon such as methylene chloride. Formation of a product which is of the desirable molecular weight consumes considerable time, the low molecular weight species first forming during the process. Often, it may take many hours before the desired molecular weight products are attained. For this reason, expedients are suggested to accelerate or catalyze the rate at which the desirable higher molecular weight form of the polycarbonate is attained.

To reduce the period of time required in the formation of high molecular weight polycarbonate resins (i.e., catalyze the formation of the resins), use of organic nitrogen catalysts is mentioned. U.S. 3,062,781, for example, describes the use of tertiary or quaternary organic bases or salts. It has, however, been observed that the quality of the polycarbonate resin can be detrimentally affected by the presence of catalyst (or a derivative thereof). Apparently, polycarbonate resins containing a catalyst such as triethylamine or other organic nitrogen catalyst suffer deleterious polymer degradation during injection molding or when otherwise subjected to elevated temperatures.

SUMMARY OF THE INVENTION

The present invention provides an effective expedient for removing deleterious concentrations of organic nitrogen catalysts such as triethylamine and other tertiary or quaternary organic bases or salts thereof from polycarbonate resins whereby to provide resins which do not suffer polymer degradation such as is exhibited by resins which have not had the organic nitrogen catalyst effectively removed. Now it has been found that washing diphenol polycarbonate resin solutions, notably partially chlorinated hydrocarbon solutions, containing contaminating concentrations of organic nitrogen catalysts with an aqueous solution of carbon dioxide which is at an acid pH below about 4.5 and above about pH 2 effectively removes the organic nitrogen catalyst.

Aqueous solutions of carbon dioxide having such an acid pH, for example, are provided by addition of carbon dioxide. For most water, the amounts of carbon dioxide so used are relatively small.

In one typical production of polycarbonate resin, phosgene is added to an agitated reaction medium which has been formed from aqueous sodium hydroxide, a diphenol, notably Bisphenol A, and partially halogenated hydrocarbon solvent for the polycarbonate product (ideally a solvent such as methylene chloride). Various other additives may be included in the reaction medium including antioxidants and monofunctional phenols (for control of the molecular weight). Phosgene is usually added gradually, 1 to 3 hours addition time being representative, at the end of which period the polymer is of relative low molecular weight. After completing the phosgene addition, the transformation of the low molecular weight species into a suitable high molecular weight range is accomplished, for example, by continuing to agitate. This transformation is facilitated considerably by the presence of organic nitrogen catalysts, i.e., tertiary or quaternary organic bases or salts, specifically trimethylamine, triethylamine, dimethylaniline, diethylaniline, dimethylcyclohexylamine, and pyridine, or their corresponding hydrochlorides, and tetramethyl ammonium hydroxide, triethyl octadecyl ammonium chloride, trimethylbenzyl ammonium fluoride, triethylbenzyl ammonium chloride, dimethyl dodecyl ammonium chloride, dimethylbenzylphenyl ammonium chloride, trimethylcyclohexyl ammonium bromide, and N-methyl pyridinium chloride.

Upon attaining the appropriate molecular weight, the polycarbonate is isolated from the organic solution in which it is present. Thus, the two substantially immiscible phases comprising the reaction medium are allowed to segregate into their respective phases. Then the aqueous phase is decanted (or otherwise phase separated). The organic phase (methylene chloride solution of polycarbonate resin) is then treated to recover polycarbonate from solvent. Sufficient organic nitrogen catalyst such as triethylamine remains with this organic phase to require its removal from the resin.

In the practice of this invention, catalyst (such as triethylamine) in the organic phase (the organic solution of polycarbonate) is removed by washing with water to which carbon dioxide is added, i.e., aqueous solutions of carbon dioxide having a pH value in the acidic range below 4.5, usually at a pH in the range of 3.5 to 4.5. High purity wash water, notably deionized water, is recommended.

Provision of appropriate aqueous solution of carbon dioxide is accomplished, for example, by carbonating water at atmospheric pressure and temperature conditions. Only a small amount of carbon dioxide need be employed. Usually, as little as 1 to 2 liters (standard pressure and temperature conditions) of $CO_2$ are involved per liter of water.

Carbon dioxide is an ideal acidifying agent for adjusting the wash water pH. Use of aqueous carbon dioxide solution not only accomplishes the effective removal of nitrogen catalyst but has the additional advantage of not contaminating further the polycarbonate solution or have a degrading effect upon the solution or its polymer content.

Because aqueous solutions of carbon dioxide do not add contamination, the organic polycarbonate solutions so washed need not be subjected to a further water wash but may be directly treated to recover solute polycarbonate therefrom. By avoiding the need for a further water wash (to remove foreign contaminants which might be introduced by other acidic agents), losses of the organic solvent due to its solubility are not encountered. For example, one of the exemplary solvents, methylene chloride, although substantially water immiscible, nevertheless, has at 20° C. a solubility of 2 parts in 100 parts water by weight. Water wash, therefore, will be apt to contain an economically significant amount of dissolved methylene chloride, the recovery of which adds important costs.

Simple washing techniques serve in the performance of this invention, although washing efficiencies are enhanced by recourse to expedients which increase the contact between wash water and organic resin solution. Recognized apparatus, such as centrifuges, e.g., Podbielniak, provide such expedients.

Once the effective washing of the organic polycarbonate solution is achieved, the polycarbonate solution is processed according to any of a number of procedures which involve winning the solute in appropriate form from solution. One such procedure, described in U.S. 3,022,271, subjects the solution to conditions under which the solvent is controllably removed and the solute extruded in molten state. Other techniques involve adding of a non-solvent for the polycarbonate to the solution to cause the solute polycarbonate to precipitate out as solid, following which the solid is separated from the liquid.

According to the principles of the present invention, any of a wide number of organic nitrogen compounds, but particularly water soluble organic nitrogen catalysts, useful in catalyzing the polycarbonate formation are separated or extracted. Generally, these catalysts are organic nitrogen compounds, i.e., water soluble organic derivatives of ammonia, notably tertiary or quaternary nitrogen type bases or salts thereof. It appears the coefficient of distribution of these catalysts in water is favorably influenced when the water is at an acidic pH, ideally in the range of 3 to 4.5.

While the organic polycarbonate solution is most apt to become contaminated with water soluble organic derivatives of ammonium due to their use as a catalyst in the manufacture of the polycarbonate resins, the invention will remove effectively such materials regardless of the manner in which they have found their way into the polycarbonate solution. Usually, the organic nitrogen compound content of the solution subjected to washing contains from 0.001 to 5 percent of the organic nitrogen by weight of the polycarbonate, this being the typical catalyst concentration. It is, however, feasible to first remove a portion of the organic nitrogen by means other than with wash water at the specified acidic pH. The resulting solution with its lowered organic nitrogen compound content may then be washed pursuant to this invention. Rarely, however, is the organic nitrogen content reduced below about 0.5 percent by weight of the polycarbonate by this partial removal.

Organic solutions of polycarbonate resin which are washed pursuant to the present invention include as their solvent component a substantially water immiscible solvent, notably partially chlorinated normally liquid hydrocarbons of 1 to 4 carbons including chloroform, methyl chloride, methylene chloride, ethylene chloride, beta,beta-dichloroethyl, ether acetylene dichloride, dichloroethylene and the dichlorobutanes. Other solvents include 1,4-dioxane, ketones such as acetones, isobutyl ketone, tetrahydrofuran, benzene, xylenes and carbon tetrachloride. Those organic solvents which not only are water immiscible or substantially water insoluble but which have the capacity to dissolve at least 3 percent by its weight of the polycarbonate product are most apt to be encountered in the solutions.

Normally, the organic polycarbonate resin solution washed in the practice of this invention is the solution which results from separation of the organic components from the medium encountered as a consequence of the polycarbonate resin manufacture. However, the invention is effective whether or not the polycarbonate solution is derived in this fashion. The polycarbonate content of the organic solution which is water washed pursuant to the present invention is between about 1 and 70 percent (more normally between 5 and 40 percent) by weight of the solvent.

In general, any polymeric polyester of carbonic acid and diphenol may comprise the solute polymer (resin) component of the solution treated pursuant to this invention. Washing with water at the controlled acidic pH of this invention (to remove organic nitrogen containing compounds from polycarbonate solutions) is applicable to solutions of any of a wide variety of polycarbonate polymers which characteristically contain as their main or prime recurring structure the following:

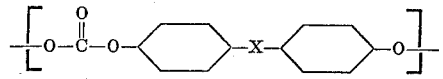

wherein X is a linking group, such as an alkylidene group, wherein the

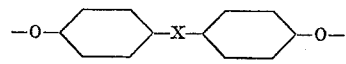

is the residue of di(monohydroxyaryl)alkane. Polycarbonates of other aromatic diols with or without still other difunctional components are also encountered. Thus, the polycarbonate polymers may include besides aromatic diols moieties of aliphatic dihydroxy compounds, notably glycols, cycloaliphatic dihydroxy compounds. Among the other moieties which the polycarbonate polymer may contain are the residues of difunctional organic compounds such as dicarboxylic acids (or anhydrides or acid chlorides) and diamines.

Polycarbonate polymers which are treated pursuant hereto include those which contain one or more of the following di(monohydroxyaryl)alkanes either with or without other difunctional organic components:

4,4'-dihydroxy-diphenyl-methane,
1,1-(4,4'-dihydroxy-diphenyl)-ethane,
1,1-(4,4'-dihydroxy-diphenyl)-propane,
1,1-(4,4'-dihydroxy-diphenyl)-butane,
1,1-(4,4'-dihydroxy-diphenyl)-2-methyl-propane,
1,1-(4,4'-dihydroxy-diphenyl)-heptane,
1,1-(4,4'-dihydroxy-diphenyl)-1-phenyl-methane,
(4,4'-dihydroxy-diphenyl)-(4-methyl-phenyl)-methane,
(4,4'-dihydroxy-diphenyl)-(4-ethyl-phenyl)-methane,
(4,4'-dihydroxy-diphenyl)-(4-isopropyl-phenyl)-methane,
(4,4'-dihydroxy-diphenyl)-(4-butyl-phenyl)-methane,
(4,4'-dihydroxy-diphenyl)-benzyl-methane,
(4,4'-dihydroxy-diphenyl)-alpha-furyl-methane,
2,2-(4,4'-dihydroxy-diphenyl)-propane,
2,2-(4,4'-dihydroxy-diphenyl)-butane,
2,2-(4,4'-dihydroxy-diphenyl)-pentane (melting point 149–150° C.3,
2,2-(4,4'1dihydroxy-diphenyl)-4-methyl-pentane,
2,2-(4,4'-dihydroxy-diphenyl)-heptane (boiling point 198–200° C. under 0.3 millimeter mercury gauge),
2,2-(4,4'-dihydroxy-diphenyl)-octane,
2,2-(4,4'-dihydroxy-diphenyl)nonane (melting point 68° C.),
1,1-(4,4'-dihydroxy-diphenyl)-1-phenyl-ethane,
1,1-(4,4'-dihydroxy-diphenyl)-1-(alpha-furyl)-ethane,
3,3-(4,4'-dihydroxy-diphenyl)-pentane,
4,4-(4,4'-dihydroxy-diphenyl)heptane,
1,1-(4,4'-dihydroxy-diphenyl)-cyclopentane,
1,1-(4,4'-dihydroxy-diphenyl)-cyclohexane,
2,2-(4,4'-dihydroxy-diphenyl)-decahydronaphthalene (melting point 181° C.),
2,2-(4,4'-dihydroxy-3,3'-dicyclohexyl-diphenyl)-propane (melting point 144–146° C.),
2,2-(4,4'-dihydroxy-3-methyl-diphenyl)-propane (melting point 114° C.),
2,2-(4,4'-dihydroxy-3-isopropyl-diphenyl)-butane, 1,1-(4,4'-dihydroxy-3,3'-dimethyl-diphenyl)-cyclohexane,
2,2-(4,4'-dihydroxy-3,3'-dibutyl-diphenyl)-propane,
2,2-(4,4'-dihydroxy-3,3'-diphenyl-diphenyl)-propane,
2,2-(4,4'-dihydroxy-2,2'-dimethyl-diphenyl)-propane,
1,1-(4,4'-dihydroxy-3,3'-dimethyl-6,6'-dibutyl-diphenyl)-butane,
1,1-(4,4'-dihydroxy-3,3'-dimethyl-6,6'-ditertiary butyl-diphenyl)-ethane,
1,1-(4,4'-dihydroxy-3,3'-dimethyl-6,6'-ditertiary butyl-diphenyl)-propane,
1,1-(4,4'-dihydroxy-3,3'-dimethyl-6,6'-ditertiary butyl-diphenyl)-butane,
1,1-(4,4'-dihydroxy-3,3'-dimethyl-6,6'-ditertiary butyl-diphenyl)-isobutane,
1,1-(4,4'-dihydroxy-3,3'-dimethyl-6,6'-ditertiary butyl-diphenyl)-heptane,
1,1-(4,4'-dihydroxy-3,3'-dimethyl-6,6'-ditertiary butyl-diphenyl)-1-phenyl-methane,
1,1-(4,4'-dihydroxy-3,3'-dimethyl-6,6'-detertiary butyl-diphenyl)-2-methyl-2-pentane,
1,1-(4,4'-dihydroxy-3,3'-dimethyl-6,6'-ditertiary butyl-diphenyl)-2-ethyl-2-hexane, and
1,1-(4,4'-dihydroxy-3,3'-dimethyl-6,6'-ditertiary amyl-diphenyl)-butane.

Aromatic diol compounds other than di(monohydroxy-aryl)alkanes whose moieties may be present in polycarbonates undergoing treatment in this invention include hydroquinone, resorcinol, pyrocatechol, 4,4'-dihydroxy-diphenyl, 2,2'-dihydroxy-diphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, di-hydroxyanthracene, 2,2'-dihydroxynaphthyl-1,1', and o, m, or p-hydroxybenzyl alcohol.

Among the non-aromatic diols whose moieties may be found in polycarbonates capable of treatment by this invention are aliphatic and cycloaliphatic dihydroxy compounds including ethylene glycol, diethylene glycol, triethylene glycol, polyethylene glycol, thiodiglycol, ethylene dithiodiglycol, the di-, and polyglycols produced from propylene oxide-1, 2, o, m, or p-xylene glycol, propane-diol-1,3, butanediol-1,3, butanediol-1,4, 2-methyl-propane-diol-1,3, pentanediol-1,5, 2-ethyl-propanediol-1,3, hexane-diol-1,6, octanediol-1,8, 1-ethyl-hexanediol-1,3, decanediol-1,10, cyclohevanediol-1,4, cyclohexanediol-1,2, 2,2-(4,4'-dihydroxy-dicyclohexylene)-propane and 2,6-dihydroxy-decahydronaphthalene.

Moieties of dicarboxylic acids, mainly saturated dicarboxylic acids, including such acids as oxalic, maleic, fumaric, succinic, adipic, phthalic, isophthalic, terephthalic, etc., can be present in polymers submitted to treatment pursuant to this invention. Polycarbonate polymers suitably treated can also have a significant content of diamine moieties such as moieties of aliphatic diamines typified by ethylene diamine, hexamethylene diamine, propylene diamine, trimethylene diamine, tetramethylene diamine, 4,4-diamino-dicyclohexylmethane, 2,4-diamino - tetrahydro-furan, 1,4-diamino - cyclohexane, the aromatic diamines such as ortho-phenylene diamine, 4,4'-diamino-diphenyl ether, 4,4'-diamino-benzophenone, 1,7-methylene diamine, piperazine, methyl piperazine, meta-phenylene diamine, ortho-tolidine, meta-tolidine, and the like.

The following example illustrates the manner in which the present invention may be performed:

EXAMPLE

A 12 liter baffled glass flask equipped with a paddle stirrer was charged with 5 moles of Bisphenol A, 16.83 moles of sodium hydroxide (as an aqueous solution containing 10 percent NaOH by weight sodium hydroxide) and 225 grams of an aqueous phenol solution containing 8 percent phenol by weight, 3000 milliliters of methylene chloride and 1 gram of sodium dithionate. While agitating the resulting mixture by operating the paddle stirrer at 240 revolutions per minute, and maintaining the mixture under a nitrogen atmosphere, gaseous phosgene was added at the rate of about 5.85 grams per minute for 118 minutes. During this addition, the temperature of the reaction medium was maintained in the range of 27° C. to 39° C. After completing the addition of phosgene, 294 grams of an aqueous solution of piperazine containing 14.7 percent piperazine (equivalent to 0.5 mole of piperazine) was added substantially uniformly over a five minute period with the paddle stirrer continuing to operate. Stirring continued for 30 additional minutes, following which 252.1 grams of an aqueous solution containing 0.82 percent by weight triethylamine was added. Thereafter, about 60 grams of aqueous sodium hydroxide containing 50 percent by weight NaOH was added and stirring continued for 135 minutes.

Upon standing, the organic and aqueous phases separated and the aqueous phase was decanted while the remaining organic phase was washed with an equal volume of deionized water. After this washing, sufficient additional methylene chloride was added to the organic solution to establish the polycarbonate content therein at about 8 percent by weight so that the resulting diluted organic solution amounted to about 5 gallons.

This diluted methylene chloride solution was then washed in a Podbielniak centrifuge at ambient temperature (i.e., about 27° C.) using deionized water which was carbonated with gaseous carbon dioxide while at room temperature and atmospheric pressure. Washing of the organic solution (and the polycarbonate resin therein dissolved) was accomplished in two passes through the centrifuge, each time using an equal volume of fresh deionized acidified washing water.

The level of triethylamine in the organic solution was in this fashion reduced to below about 0.002 gram per liter, a level not deleterious to the resin and which is well below that attainable when the wash water was not at an acidic pH.

Subsequent to washing, the polycarbonate resin containing solution is treated to recover the resin from solvent by first concentrating the solution by atmospheric distillation to half its volume and then adding an equal volume of petroleum ether to cause the polycarbonate to precipitate from solution. After the precipitate hardened, most of the solvent was decanted and the precipitate was ground into a fine powder. The powder was combined with the decanted solvent and evaporated to dryness while stirring. The residue was then dried in a vacuum oven at 110° C. for 15 hours at 1 millimeter mercury pressure. The resulting product was extruded to pellets to give a product which had a melt flow K-value of 0.88 and a heat distortion temperature of 136° C.

The foregoing example illustrates the specific manner of preparing a polycarbonate resin having as a predominant structural characteristic the recurring Bisphenol A carbonate linkage in combination with carbamate linkages derived from the interrecation of the amine with chloroformate groups. The invention is also applicable to removal of triethylamine from organic solutions of other polycarbonates besides the specific polycarbonate described in this example. For example, the invention is effective when no piperazine is included in the procedure in the example. Triethylamine or like fully substituted organic derivatives of ammonia in solutions other than methylene chloride are also treated.

Washing temperatures are chosen taking into account the normal vapor pressure of the most volatile component since in general operation at atmospheric or essentially atmospheric conditions and temperatures is convenient. This, however, does not preclude the reliance upon higher temperatures and superatmospheric pressures to avoid premature undesirable vaporization and loss of components such as organic solvent (when it is a relatively low boiling solvent such as methylene chloride). So long as the washing is conducted in the liquid phase, any temperature or pressure which admits suitably of washing in the liquid phase suffices.

I claim:

1. In the manufacture of polycarbonate polyester of carbonic acid and diphenol wherein the polyester is in a solution of a substantially water immiscible organic solvent having a significant water solubility which contains organic nitrogen catalyst for the polyester formation, the improvement which comprises washing the said organic solution of polycarbonate with an acidic aqueous solution of carbon dioxide at an acidic pH below 4.5 and above 2 to remove by such washing organic nitrogen catalyst from the solution and without subsequent further water washing of the solution recovering polycarbonate resin from the solution.

2. The method of claim 1 wherein the diphenol is a di(monohydroxyaryl)alkane.

3. The method of claim 1 wherein the polycarbonate polyester solution is provided by phosgenating a di(monohydroxyaryl)alkane in a liquid reaction medium which includes water and such a water immiscible organic solvent for the polycarbonate.

4. The method of claim 1 wherein the pH of the aqueous solution of carbon dioxide is controlled between 3 and 4.5.

References Cited

FOREIGN PATENTS

| | | | |
|---|---|---|---|
| 2,979,509 | 4/1961 | Warner | 260—96 |
| 3,136,741 | 6/1964 | Schnell et al. | 260—47 |
| 3,173,891 | 3/1965 | Fry et al. | 260—47 |
| 3,213,059 | 10/1965 | Deanin et al. | 260—47 |
| 3,251,807 | 5/1966 | Deanin et al. | 260—47 |
| 3,267,075 | 8/1966 | Schnell et al. | 260—47 |

SAMUEL H. BLECH, Primary Examiner

U.S. Cl. X.R.

260—96